US008659855B2

(12) United States Patent
Dimitrov et al.

(10) Patent No.: US 8,659,855 B2
(45) Date of Patent: Feb. 25, 2014

(54) TRILAYER READER WITH CURRENT CONSTRAINT AT THE ABS

(75) Inventors: Dimitar Velikov Dimitrov, Edina, MN (US); Dion Song, Eden Prairie, MN (US); Mark William Covington, Edina, MN (US); James Wessel, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 137 days.

(21) Appl. No.: 12/727,698

(22) Filed: Mar. 19, 2010

(65) Prior Publication Data

US 2011/0228428 A1   Sep. 22, 2011

(51) Int. Cl.
*G11B 5/39*  (2006.01)

(52) U.S. Cl.
USPC ............ 360/322; 360/315; 360/320; 360/324

(58) Field of Classification Search
USPC ........................... 360/315, 319, 320, 322, 324
See application file for complete search history.

(56) References Cited

U.S. PATENT DOCUMENTS

| | | | |
|---|---|---|---|
| 5,576,914 A | 11/1996 | Rottmayer et al. | |
| 5,818,685 A * | 10/1998 | Thayamballi et al. | 360/324 |
| 6,256,176 B1 * | 7/2001 | Mao et al. | 360/324.1 |
| 6,569,295 B2 | 5/2003 | Hwang et al. | |
| 6,700,760 B1 | 3/2004 | Mao | |
| 7,016,162 B2 | 3/2006 | Yuasa et al. | |
| 7,035,062 B1 | 4/2006 | Mao et al. | |
| 7,072,152 B2 | 7/2006 | Yuasa et al. | |
| 7,245,461 B2 | 7/2007 | Yuasa et al. | |
| 7,333,304 B2 | 2/2008 | Gill et al. | |
| 8,289,660 B2 * | 10/2012 | Dimitrov et al. | 360/319 |
| 2002/0051380 A1 | 5/2002 | Kamiguchi et al. | |
| 2002/0114111 A1 * | 8/2002 | Zhu | 360/324.2 |
| 2004/0160700 A1 * | 8/2004 | Kagami et al. | 360/244 |
| 2005/0030673 A1 | 2/2005 | Oshima et al. | |
| 2005/0063100 A1 | 3/2005 | Kautzky et al. | |
| 2006/0044701 A1 * | 3/2006 | Funayama | 360/322 |
| 2006/0092582 A1 * | 5/2006 | Gill et al. | 360/324.12 |
| 2006/0230601 A1 * | 10/2006 | Gill et al. | 29/603.13 |
| 2006/0232893 A1 * | 10/2006 | Gill et al. | 360/324.12 |
| 2006/0245117 A1 | 11/2006 | Nowak et al. | |
| 2007/0230065 A1 | 10/2007 | Yuasa et al. | |
| 2009/0034132 A1 * | 2/2009 | Miyauchi et al. | 360/324 |
| 2009/0034133 A1 * | 2/2009 | Miyauchi et al. | 360/324 |
| 2009/0109580 A1 * | 4/2009 | Ayukawa et al. | 360/324.12 |
| 2010/0027167 A1 * | 2/2010 | Gill et al. | 360/319 |
| 2012/0268847 A1 * | 10/2012 | Dimitrov et al. | 360/320 |

FOREIGN PATENT DOCUMENTS

| | | |
|---|---|---|
| JP | 2009-032382 | 2/2009 |
| KR | 10-0617282 | 8/2006 |
| WO | 03/079331 A1 | 9/2003 |

* cited by examiner

*Primary Examiner* — Craig A. Renner
(74) *Attorney, Agent, or Firm* — Hall Estill Attorneys at Law

(57) ABSTRACT

A magnetoresistive read sensor with improved sensitivity and stability is described. The sensor is a trilayer stack positioned between two electrodes. The trilayer stack has two free layers separated by a nonmagnetic layer and a biasing magnet positioned at the rear of the stack and separated from the air bearing surface. Current in the sensor is confined to regions close to the air bearing surface by an insulator layer to enhance reader sensitivity.

16 Claims, 6 Drawing Sheets

TRILAYER READER WITH CURRENT CONSTRAINT AT THE ABS

SUMMARY

A magnetoresistive sensor has at least a trilayer stack comprising a cap layer, a first ferromagnetic layer, and a second ferromagnetic layer separated by a nonmagnetic layer. The trilayer sensor is biased by a back biasing magnet positioned at the back end of the stack. An insulator layer partially covers the trilayer stack such that a current passing through the stack is confined to the vicinity of the air bearing surface to increase sensitivity.

DETAILED DESCRIPTION

Figure 1:
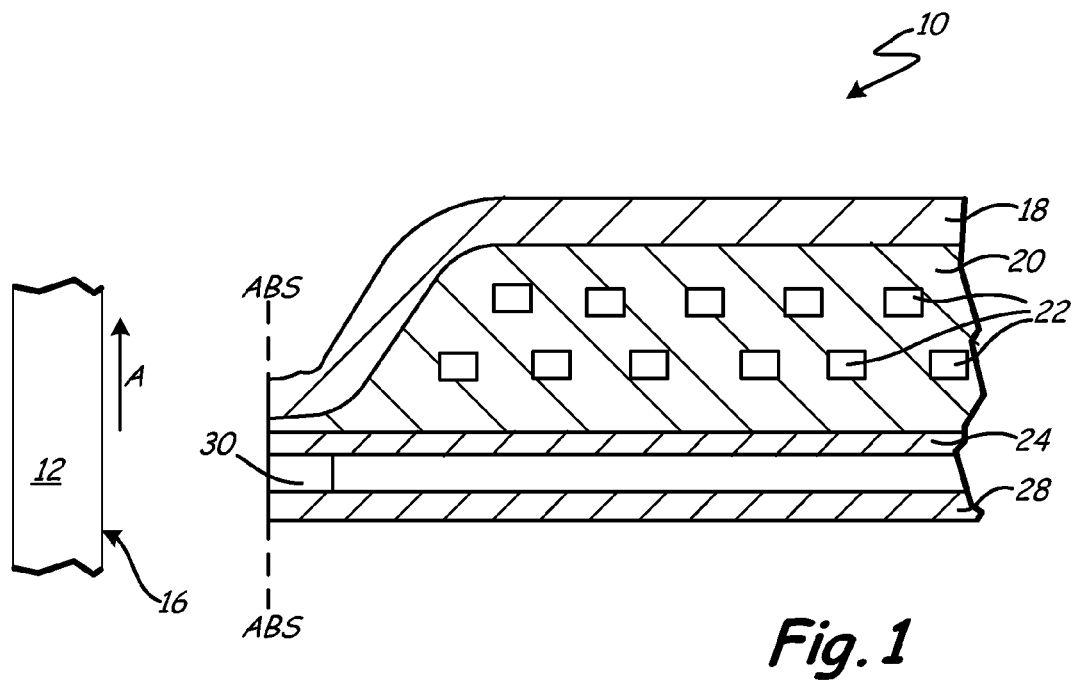
FIG. 1 is a schematic cross-sectional view of a magnetic read/write head and magnetic disc taken along a plane normal to an air bearing surface (ABS) of the read/write head.

FIG. 1 is a schematic cross-sectional view of an example magnetic read/write head 10 and magnetic disc 12 taken along a plane normal to air bearing surface ABS of read/write head 10. Air bearing surface ABS of magnetic read/write head 10 faces disc surface 16 of magnetic disc 12. Magnetic disc 12 travels or rotates in a direction relative to magnetic read/write head 10 as indicated by arrow A. Spacing between air bearing surface ABS and disc surface 16 is preferably minimized while avoiding contact between magnetic read/write head 10 and magnetic disc 12.

A writer portion of magnetic read/write head 10 includes at least top pole 18, insulator 20, conductive coils 22, and bottom pole/top shield 24. Conductive coils 22 are held in place between top pole 18 and top shield 24 by use of insulator 20. Conductive coils 22 are shown in FIG. 1 as two layers of coils but may also be formed of any number of layers of coils as is well known in the field of magnetic read/write head design.

A reader portion of magnetic read/write head 10 includes at least bottom pole/top shield 24, bottom shield 28, and magnetoresistive (MR) stack 30. MR stack 30 is positioned between terminating ends of bottom pole 24 and bottom shield 28. Bottom pole/top shield 24 functions both as a shield and as a shared pole for use in conjunction with top pole 18.

Figure 2:
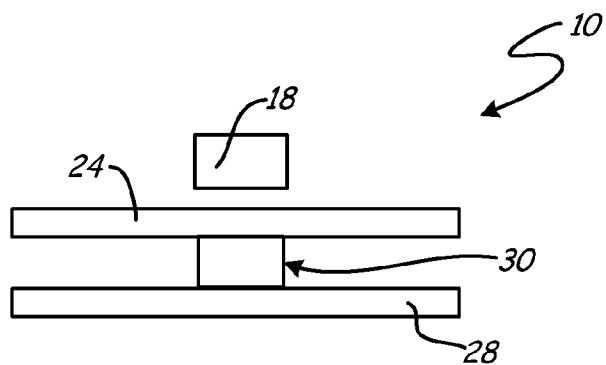
FIG. 2 is a schematic ABS view of the magnetic read/write head of FIG. 1.

FIG. 2 is a schematic view of air bearing surface ABS of the magnetic read/write head 10 embodiment of FIG. 1. FIG. 2 illustrates the location of magnetically significant elements in magnetic read/write head 10 as they appear along air bearing surface ABS of magnetic read/write head 10 of FIG. 1. In FIG. 2 all spacing and insulating layers of magnetic read/write head 10 are omitted for clarity. Bottom shield 28 and bottom pole/top shield 24 are spaced to provide for a location of MR stack 30. A sense current is caused to flow through MR stack 30 via bottom pole/top shield 24 and bottom shield 28. While the sense current is injected through the bottom pole/top shield 24 and bottom shield 28 in FIGS. 1 and 2, other configurations have MR stack electrically isolated from bottom pole/top shield 24 and bottom shield 28 with additional leads providing the sense current to MR stack 30. As the sense current is passed through MR stack 30, the read sensor exhibits a resistive response, which results in a varied output voltage. Because the sense current flows perpendicular to the plane of MR stack 30, a reader portion of magnetic read/write head 10 is a current perpendicular to plane (CPP) type device. Magnetic read/write head 10 is merely illustrative and other CPP configurations may be used in accordance with the present invention.

Figure 3:
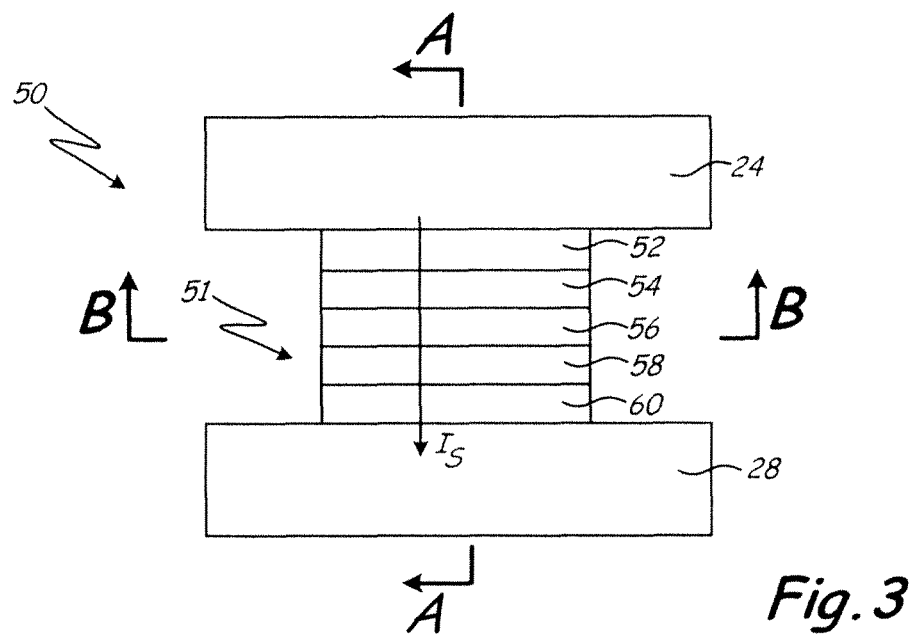
FIG. 3 shows a schematic ABS view of a typical trilayer current perpendicular to the plane (CPP) sensor stack.

FIG. 3 shows an ABS view of an example trilayer CPP MR sensor 50 comprising trilayer MR stack 51. MR stack 51 includes at least a metal cap layer 52, first freelayer 54, nonmagnetic layer 56, second freelayer 58, and metal seedlayer 60. Trilayer MR stack 51 is positioned between bottom pole/top shield 24 and bottom shield 28.

In operation, sense current $I_s$ flows perpendicularly to the plane of layers 52-60 of trilayer MR stack 51 and experiences a resistance which is proportional to the cosine of an angle formed between the magnetization directions of first freelayer 54 and second free layer 56. The voltage across trilayer MR stack 51 is then measured to determine the change in resistance and the resulting signal is used to recover encoded information from the magnetic medium. It should be noted that trilayer MR stack 51 configuration is merely illustrative and other layer configurations for trilayer MR stack 51 may be used in accordance with the present invention.

Figure 4:
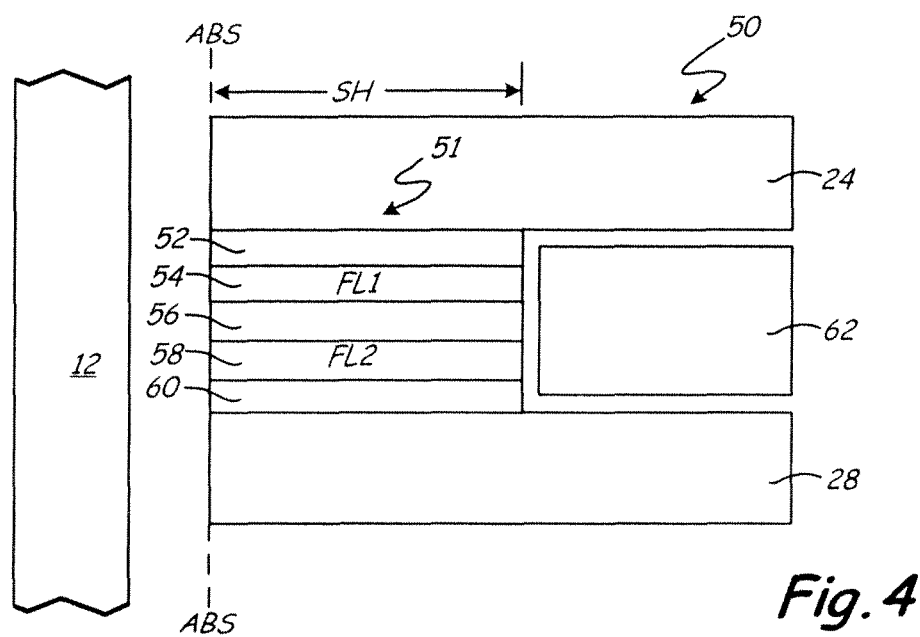
FIG. 4 is a schematic cross-sectional view of the sensor stack shown in FIG. 3 taken along section A-A.

The magnetization orientations of first freelayer 54 and second freelayer 58 in trilayer MR stack 51 are antiparallel and initially set parallel to the ABS in the absence of other magnetic fields or forces. The alignment of the freelayers in this antiparallel direction is attributed to magnetostatic interactions between the two freelayers and occurs when the reader width (RW) is larger than the stripe height (SH). To increase the sensitivity of the reader, the alignment of the two freelayers is preferably an orthogonal alignment relative to each other and about 45 degrees to the ABS, respectively. This is accomplished in some embodiments by a back bias magnet, (not shown in FIG. 3) behind trilayer MR stack 51 biasing each freelayer. FIG. 4, which is a schematic cross-section of CPP MR sensor 50 taken along section A-A in FIG. 3, shows back bias magnet 62 behind the MR stack 51 recessed from the ABS and positioned between bottom pole/top shield 24 and bottom shield 28. The length of trilayer sensor stack 51 behind the ABS is the stripe height SH and, as will be shown, is an important variable in embodiments to be discussed.

Figures 5, 5A:
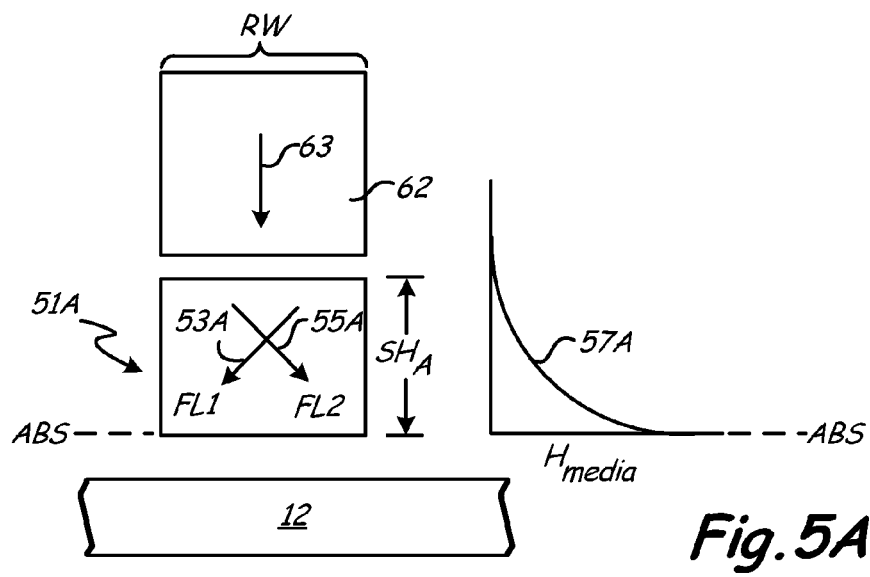
FIG. 5 is a schematic cross-sectional view of a trilayer sensor with a short stripe height taken along section B-B in FIG. 3.
FIG. 5A is a graph of magnetic field strength in the trilayer sensor of FIG. 5.

An example schematic cross-section perpendicular to the ABS of trilayer CPP MR sensor 50 along section B-B in FIG. 3 is shown in FIG. 5. Trilayer MR stack 51A with air bearing surface ABS is shown positioned above recording medium 12. Back bias magnet 62 is shown positioned above trilayer MR stack 51A recessed from air bearing surface ABS.

Trilayer MR stack 51A has a layer structure identical to trilayer MR stack 51. Magnetization of back bias magnet 62 is shown by arrow 63 as pointing in a vertical downward direction towards air bearing surface ABS. Magnetizations of first freelayer FL1 and second freelayer FL2 of trilayer MR stack 51A are shown schematically by arrows 53A and 55A respectively. As noted earlier, in the absence of back bias magnet 62, magnetizations 53A and 55A would be parallel to the ABS and antiparallel to each other. The presence of back bias magnet 62 forces magnetizations 53A and 55A into a scissor relationship as shown.

Curve 57A in the graph of FIG. 5A depicts the magnetic field strength $H_{media}$ from recording medium 12 in trilayer MR stack 51A. As shown in FIG. 5A, the magnetic field strength in the sensor decays exponentially as a function of distance from the ABS. In the sensor geometry shown in FIG. 5, the reader width RW is larger than the stripe height $SH_A$ of trilayer stack 51A. The scissors relation of magnetizations 53A and 55A of freelayers FL1 and FL2 result in increased sensitivity because both magnetizations freely respond to $H_{media}$, the media flux. However, minor changes caused by process variability during fabrication can cause unacceptably large variability in sensor output or even magnetically unstable parts that will decrease product yield to unacceptable levels.

Figures 6, 6A:
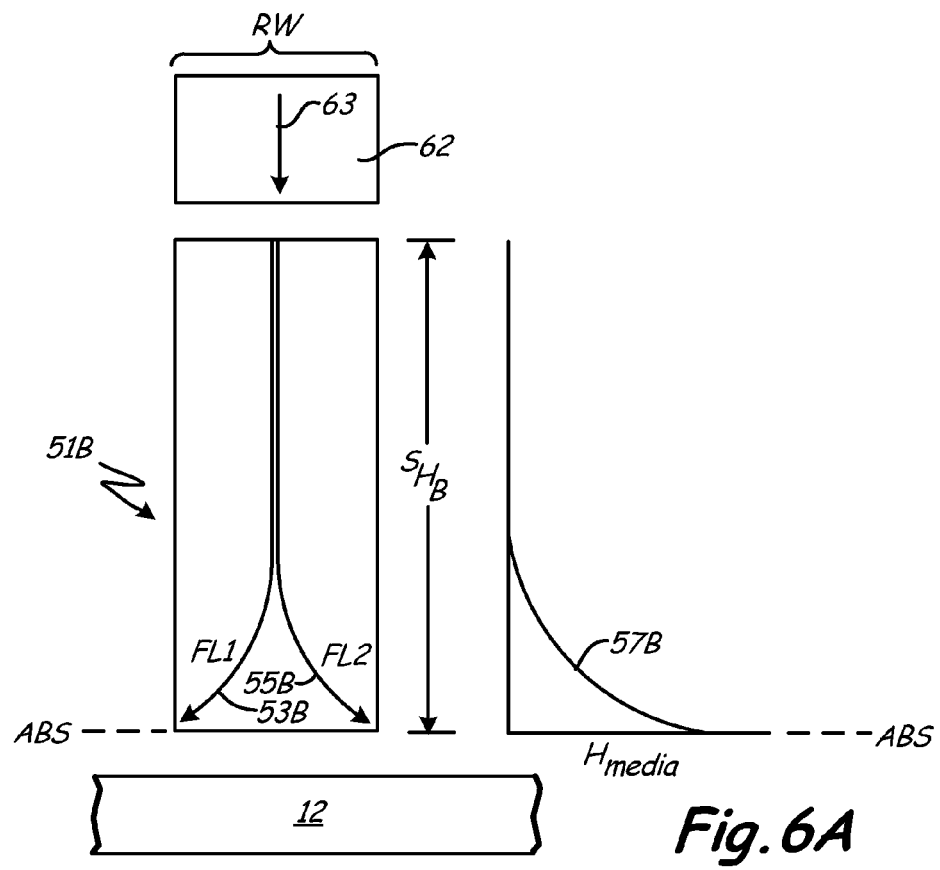
FIG. 6 is a schematic cross-sectional view of a trilayer sensor with a long stripe height taken along section B-B in FIG. 3.
FIG. 6A is a graph of magnetic field strength in the trilayer sensor of FIG. 6.

A variation of the sensor geometry shown in FIG. 5 is shown in FIG. 6. Back bias magnet 62 is shown positioned above trilayer MR stack 51B distal from air bearing surface ABS. Trilayer MR stack 51B has a layer structure identical to trilayer MR stack 51. Trilayer MR stack 51B differs from trilayer MR stack 51A in that the stripe height $SH_B$ of trilayer MR stack 51B is longer than the reader width RW of trilayer MR stack 51B by at least a factor of two. Curve 57B in the graph of FIG. 6A depicts the magnetic field strength $H_{media}$ from recording medium 12 in trilayer MR stack 51B. Both sensor stacks 51A and 51B have the same reader width RW. Magnetization of back bias magnet 62 is shown by arrow 63 as pointing in a vertical downward direction toward air bearing surface ABS. Magnetizations of first freelayer FL1 and second freelayer FL2 are shown schematically by arrows 53B and 55B respectively.

In contrast to the magnetization orientations of trilayer MR stack 51A, the magnetizations of each freelayer at the backend of trilayer MR stack 51B are stable and parallel to the magnetization of back bias magnet 62 as indicated by arrow 63. Due to the long stripe height of trilayer MR stack 51B, the magnetization of free layers FL1 and FL2 naturally relax into the divergent orientations proximate the ABS as shown by arrows 53B and 55B due to the magnetostatic interaction between FL1 and FL2. The stability and robustness of trilayer sensor stack 51B significantly exceeds that of trilayer MR stack 51A. The increased stability, however, comes with a cost. As a result of the increased stripe height, a majority of the length of trilayer MR stack 51B does not contribute to the magnetoresistive sensing signal. Rather, the back end of the sensor stack functions as an electrical shunt, thereby decreasing the sensor output.

The various embodiments discussed in what follows circumvent the problem and provide trilayer reader sensors with robust stability as well as increased sensitivity.

Figure 7:
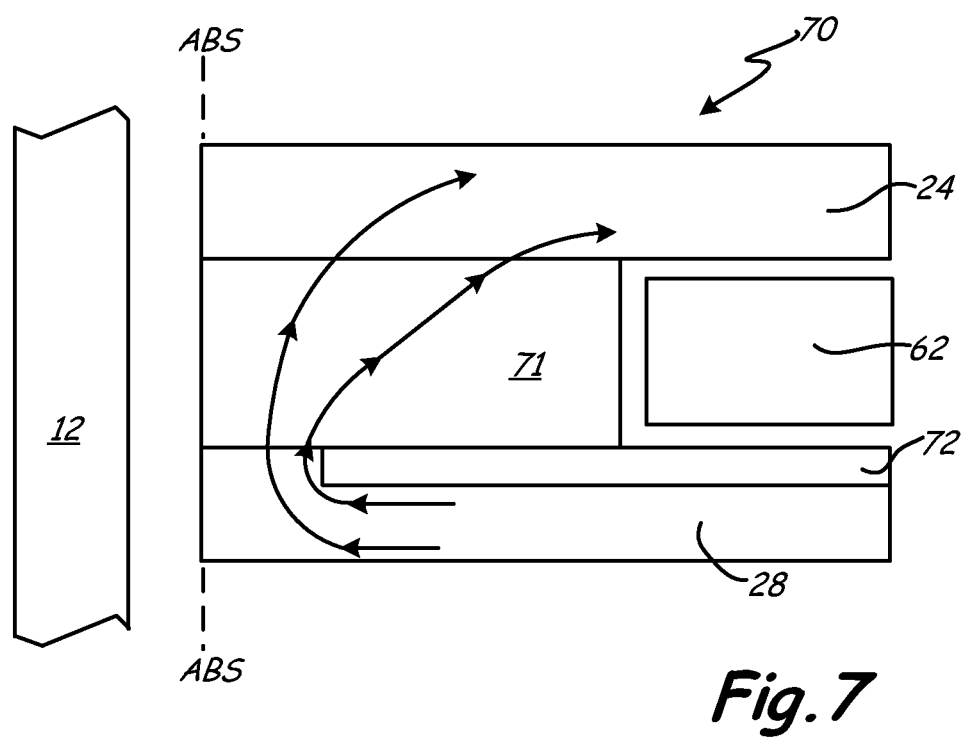
FIGS. 7-10 are schematic cross-sectional views of four different embodiments of a trilayer sensor according to the invention.

An exemplary embodiment is shown by CPP MR sensor 70 in FIG. 7. In CPP MR sensor 70, trilayer MR stack 71 has a stripe height of at least twice reader width RW as shown in FIG. 6. CPP MR sensor 70 is comprised of trilayer MR stack 71 positioned between bottom pole/top shield 24 and bottom shield 28 with back gap magnet 62 behind the trilayer MR stack 51 as in CPP MR sensor 50 shown in FIG. 4. The difference is that insulator layer 72 in CPP MR sensor 70 is positioned between trilayer MR stack 71 and bottom shield 28. Insulator layer 72 extends from the back end of bottom shield 28 to a distance close to the ABS, thereby providing a constriction in the current flow from bottom shield 28 through trilayer MR stack 71 to bottom pole/top shield 24. By constricting the current flow to the vicinity of the ABS, as shown by the arrows, electrical shunting at the back end of trilayer MR stack 71 is blocked resulting in increased sensor output.

Figure 8:
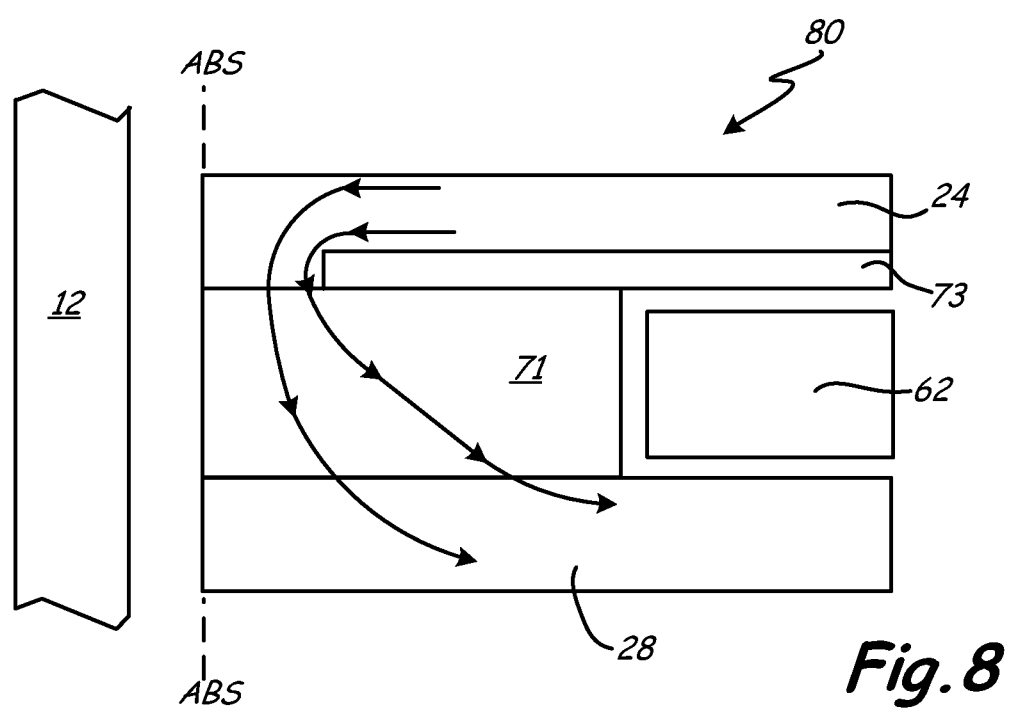

Another exemplary embodiment is shown in FIG. 8. CPP MR sensor 80 is comprised of trilayer MR stack 71 with a long stripe height positioned between bottom pole/top shield 24 and bottom shield 28 with back gap magnet 62 behind trilayer MR stack 71. In this case, insulator layer 73 is positioned between bottom pole/top shield 24 and trilayer MR stack 71. Insulator layer 73 extends from the back end of bottom shield 28 to a distance close to the ABS, thereby providing a constriction in the current flow from top shield 24 through trilayer MR stack 71 to bottom shield 28 as indicated by the arrows. By constricting the current flow to the vicinity of the ABS, electrical shunting at the back end of trilayer MR stack 71 is blocked resulting in increased sensor output.

Figure 9:
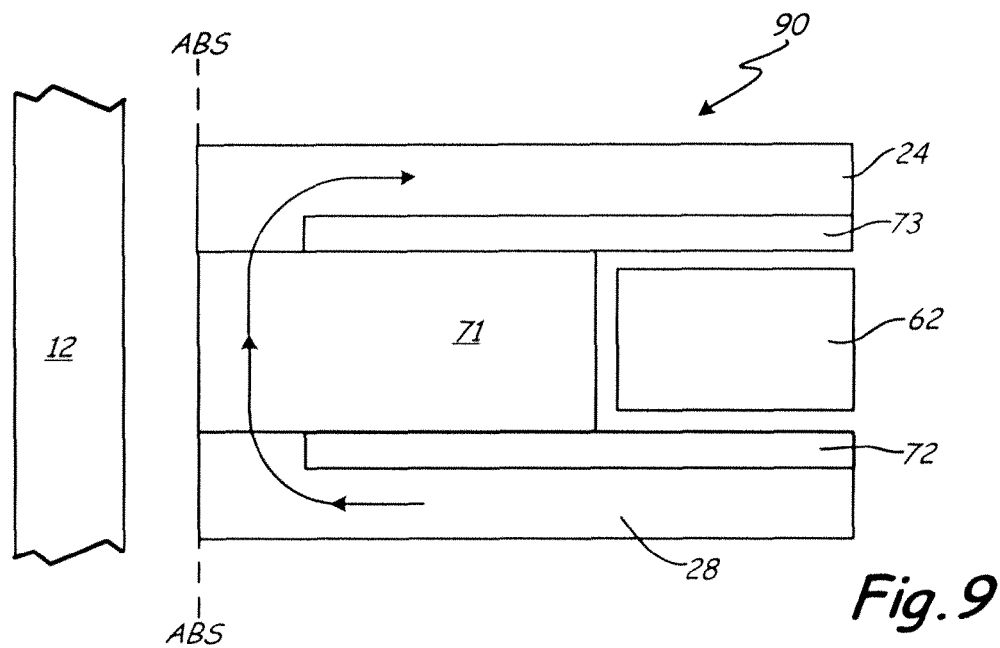

Another exemplary embodiment of the invention is shown in FIG. 9. CPP MR sensor 90 is comprised of trilayer MR stack 71 with a long stripe height positioned between bottom pole/top shield 24 and bottom shield 28 with back gap magnet 62 behind trilayer MR stack 71. In this case, insulator layer 73 is positioned between bottom pole/top shield 24 and trilayer MR stack 71 and insulator layer 72 is positioned between bottom shield 28 and trilayer MR stack 71. Insulator layers 72 and 73 extend from the back ends of top and bottom shields 24 and 28 to a distance close to the ABS thereby providing a constriction in the current flow between bottom pole/top shield 24 and bottom shield 28 or between bottom shield 28 and bottom pole/top shield 24 through trilayer MR stack 71. By constricting the current flow to the vicinity of the ABS, electrical shunting at the back end of trilayer MR stack 71 is blocked, resulting in increased sensor output.

Figure 10:
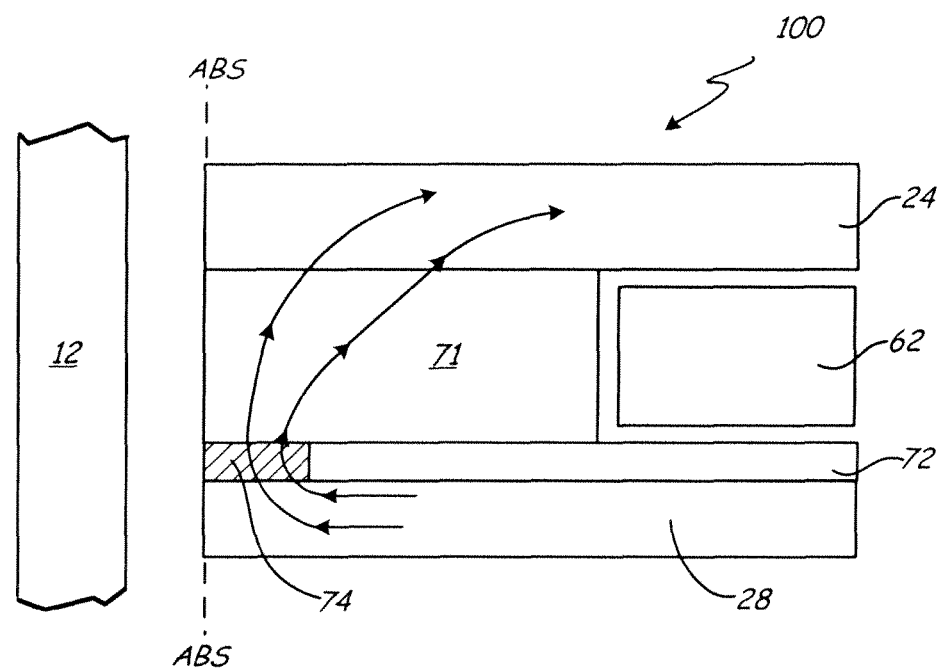

Another embodiment is shown in FIG. 10. CPP MR sensor 100 is comprised of trilayer MR stack 71 with a long stripe height positioned between bottom pole/top shield 24 and bottom shield 28 with back gap magnet 62 behind trilayer MR stack 71. Insulator layer 72 extends from the back end of bottom shield 28 to the ABS. In this case, a portion of insulator layer 72 proximate the ABS has been treated to transform insulator layer 72 into electrically conducting portion 74. Electrically conducting portion 74 provides a constriction in the current flow from bottom shield 28 to bottom pole/top shield 24 through trilayer MR stack 71 as indicated by the arrows. By constricting the current flow to the vicinity of the ABS as the current passes through trilayer MR stack 71, electrical shunting at the back end of trilayer MR stack 71 is blocked, resulting in increased sensor output.

Insulator layer 72 can be converted to electrically conducting region 74 after the ABS is lapped by a number of processes. Some of these are described here. One approach is to use co-sputtered Fe and $SiO_2$ as the insulating layer. The resulting Fe/$SiO_2$ layer is amorphous and electrically resistant. Preferential heat treatment of the ABS to moderate temperatures of about 350° C. to 400° C. by exposing the ABS to a laser beam will cause Fe segregation and the formation of electrically conductive channels close to the ABS. Another approach is to use a $TiO_x$ barrier layer as the insulating layer. Lapping the ABS containing $TiO_x$ insulating layers in an ordinary atmosphere or in hydrogen forms defects in the $TiO_x$ layers that form conductive channels, thereby allowing current flow at the ABS.

Insulator layers that have been transformed into conducting channels at the ABS to constrict current flow through sensor stack 71 at the ABS can also be positioned between bottom pole/top shield 24 and stack 71 and between bottom shield 28 and stack 71. It should be noted that the sensor stacks described above are merely illustrative and other configurations may be used in accordance with the present invention.

While the present disclosure has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the technology without departing from the essential scope thereof. Therefore, it is intended that the various embodiments not be limited to the particular embodiment(s) disclosed, but that the invention will include all embodiments falling within the scope of the appended claims.

The invention claimed is:

1. A magnetoresistive sensor comprising:
   first and second electrodes coupled to opposite sides of a trilayer stack on an air bearing surface (ABS), the stack having a uniform first stripe height from the ABS and comprising a plurality of ferromagnetic layers separated by a nonmagnetic layer and disposed between cap and seed layers;
   a back biasing magnet adjacent a back end of the trilayer stack distal the ABS; and
   an insulator layer and conducting insert directly contacting at least one of the cap and seed layers within the uniform first stripe height of the trilayer stack and first electrode to form a current constriction region that confines current to a predetermined vicinity of the ABS, the conducting insert having a second stripe height from the ABS that is smaller than the uniform first stripe height.

2. The sensor of claim 1, wherein the insulator layer completely covers the trilayer stack, the conducting insert has been transformed from the insulating layer to a conducting material such that a current passed between the electrodes is confined to the predetermined vicinity of the ABS when passing through the trilayer stack.

3. The sensor of claim 1, wherein magnetizations of the ferromagnetic layers are oriented about perpendicular to each other and about 45 degrees to the air bearing surface.

4. The sensor of claim 1, wherein the nonmagnetic layer is an electrical conductor.

5. The sensor of claim 4, wherein the nonmagnetic layer comprises one of Cu, Ag, Au, or an alloy thereof.

6. The sensor of claim 1, wherein the nonmagnetic layer is an electrical insulator.

7. The sensor of claim 6, wherein the nonmagnetic layer is selected from the group consisting of $Al_2O_x$, $TiO_x$, and MgO.

8. The sensor of claim 1, wherein the ferromagnetic layers are free layers.

9. The sensor of claim 8, wherein the free layers comprise one of FeCoB, NiFeCo, CoFeHf, NiFe, FeCo, or an alloy thereof.

10. An apparatus comprising:
    a top electrode and a bottom electrode coupled to opposite sides of a trilayer stack on an air bearing surface (ABS), the stack having a uniform first stripe height from the ABS and comprising a plurality of ferromagnetic layers separated by a nonmagnetic layer and disposed between cap and seed layers; and
    a back biasing magnet adjacent a back end of the trilayer stack distal the ABS, at least one of the top and bottom electrodes electrically connected to at least one of the cap and seed layers within the uniform first stripe height of the trilayer stack via a conducting insert contacting the trilayer stack, the insulating layer directly contacting the trilayer stack to provide a current constriction region defined by a second stripe height from the ABS that is smaller than the uniform first stripe height and confines current passing between the electrodes to a predetermined vicinity of the ABS.

11. The apparatus of claim 10, wherein magnetization directions of the ferromagnetic layers are oriented about perpendicular to each other and about 45 degrees to the air bearing surface.

12. The apparatus of claim 10, wherein the nonmagnetic layer is an electrical conductor.

13. The apparatus of claim 10, wherein the plurality of ferromagnetic layers are free layers.

14. A method comprising:
    forming first and second electrodes coupled to opposite sides of a trilayer stack on an air bearing surface (ABS), the trilayer stack having a uniform first stripe height from the ABS and comprising a plurality of magnetically free ferromagnetic layers separated by a nonmagnetic layer and disposed between cap and seed layers;
    constructing an insulating layer directly contacting the first electrode;
    positioning a back bias magnet adjacent a back end of the trilayer stack, distal the ABS; and
    treating the insulating layer to convert a predetermined portion of the insulating layer to an electrically conductive material to form a conducting insert that confines current to a predetermined vicinity of the ABS within the uniform first stripe height of the trilayer stack on the ABS, the conducting insert having a second stripe height from the ABS that is smaller than the uniform first stripe height.

15. The method of claim 14, the back biasing magnet providing a biasing magnetization to set the magnetically free ferromagnetic layers with orthogonal magnetizations.

16. A magnetic element comprising a trilayer stack positioned on an air bearing surface (ABS) between first and second electrodes, the trilayer stack having a first stripe height and comprising a nonmagnetic layer disposed between first and second ferromagnetic layers and cap and seed layers on the ABS, at least one of the electrodes contacting the seed layer of the trilayer stack with a conducting insert proximal the ABS, the conducting insert having a second stripe height that is less than the first stripe height.

* * * * *